April 14, 1931.  F. W. TEMPLE  1,800,762
AMPLIFYING HORN
Filed March 15, 1928   4 Sheets-Sheet 1
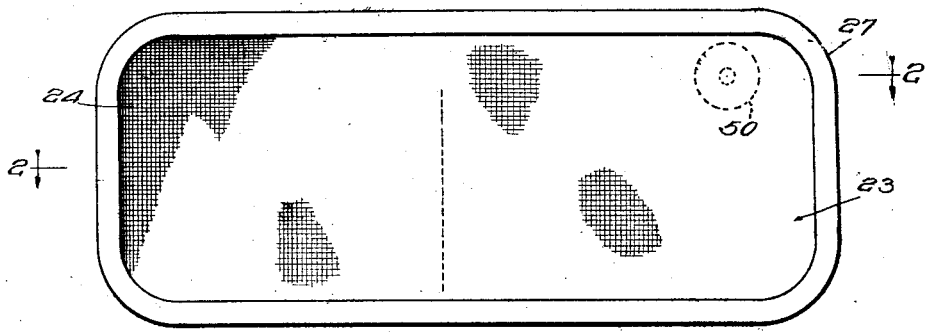
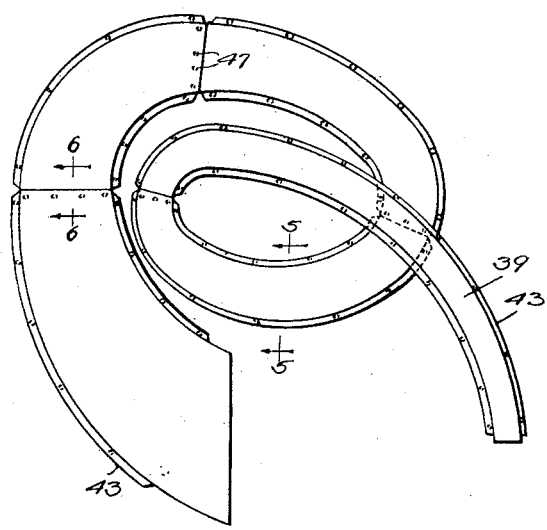
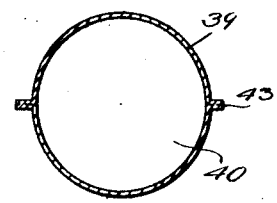
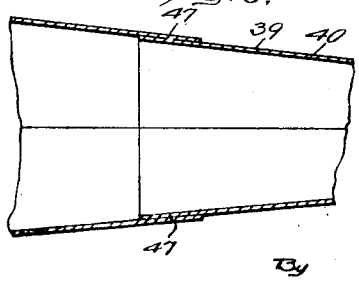
Witness.
William P. Kilroy
Inventor:
Fred W. Temple
By Hill & Hill
Attys

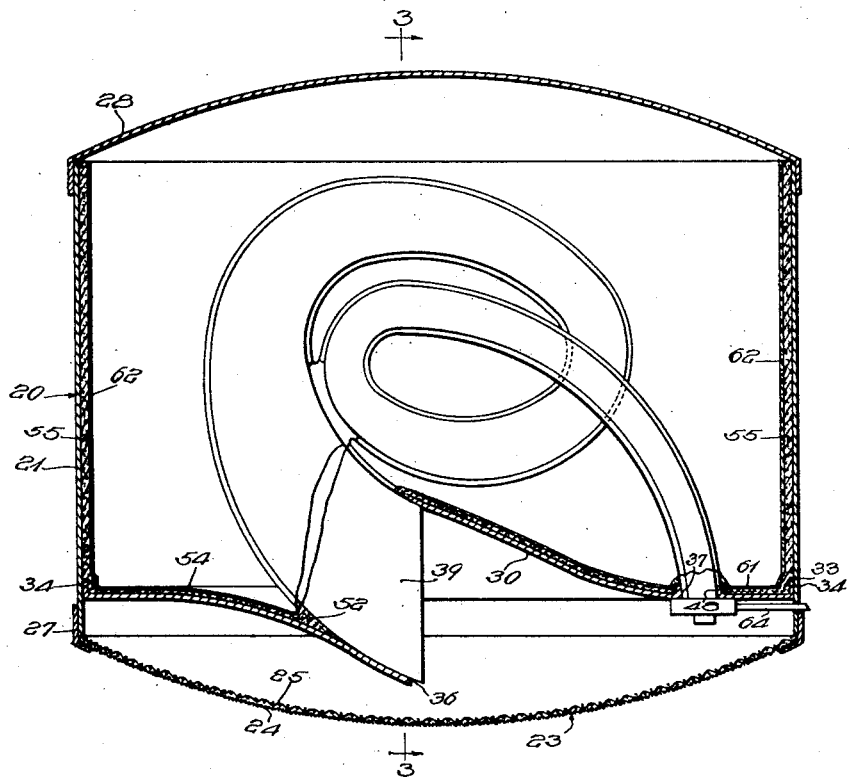

April 14, 1931. F. W. TEMPLE 1,800,762
AMPLIFYING HORN
Filed March 15, 1928 4 Sheets-Sheet 3

Witness:
William P. Milroy

Inventor:
Fred W. Temple
By Hill & Hill
Attys

April 14, 1931.  F. W. TEMPLE  1,800,762
AMPLIFYING HORN
Filed March 15, 1928   4 Sheets-Sheet 4
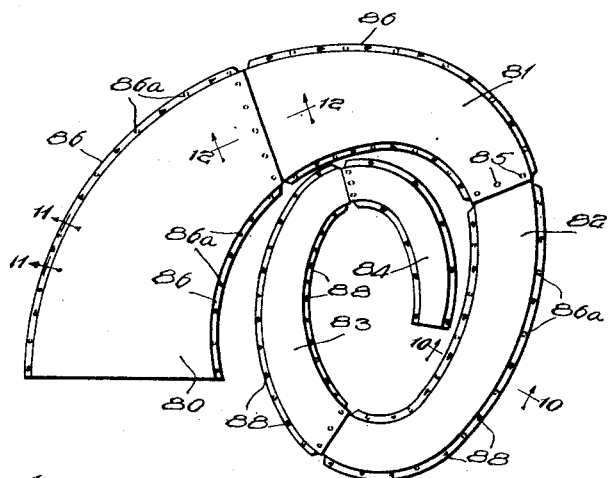
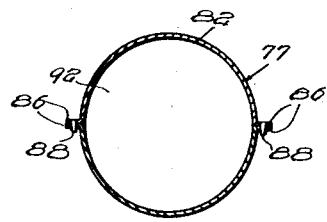
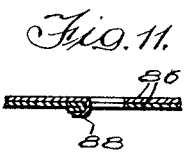
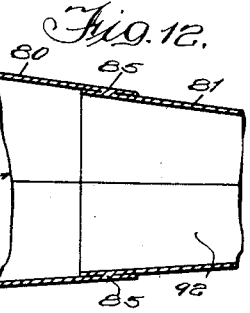
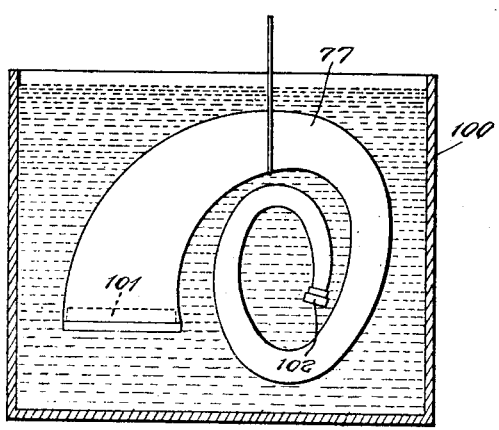
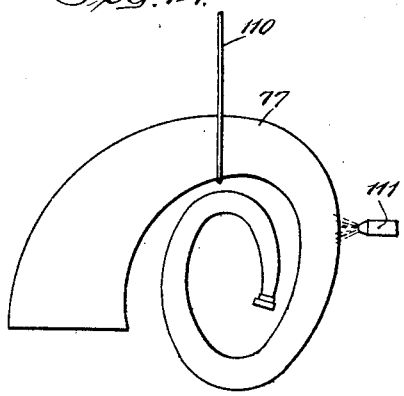
Witness:
William P. Kilroy
Inventor
Fred W. Temple
Hill & Hill
Attys Patented Apr. 14, 1931

1,800,762

UNITED STATES PATENT OFFICE

FRED W. TEMPLE, OF CHICAGO, ILLINOIS, ASSIGNOR TO TEMPLE, INC., OF CHICAGO, ILLINOIS, A CORPORATION OF ILLINOIS

AMPLIFYING HORN

Application filed March 15, 1928. Serial No. 261,991.

My invention relates to amplifying horns and a method of producing them, and has among its other objects the production of amplifying horns that are compact and durable in construction.

Particular objects of the invention are to provide an improved method of producing amplifying horns having relatively long sound passages that are formed without using removable flexible cores; to provide an improved method of producing amplifying horns having walls constructed so that they do not vibrate and distort sounds issuing from the horns; to provide amplifying horns, the walls of which are relatively light in construction and do not vibrate to distort sounds issuing from the horns; to provide amplifying horns having smooth sound passages which do not absorb the relatively highly pitched tones, and broadly to produce improved amplifying horns which will reproduce sounds without distortion thereof.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of an amplifying horn which embodies the invention;

Fig. 2 is a section taken on line 2—2 of Fig. 1;

Fig. 3 is a section taken on line 3—3 of Fig. 2;

Fig. 4 is an elevation of a tubular member which forms part of the improved amplifying horn shown in Figs. 1, 2 and 3;

Fig. 5 is an enlarged section taken on line 5—5 of Fig. 4;

Fig. 6 is an enlarged section taken on line 6—6 of Fig. 4;

Fig. 9 is an elevation of a tubular member which forms part of the improved horn shown in Figs. 7 and 8;

Fig. 10 is an enlarged section taken on line 10—10 of Fig. 9;

Fig. 11 is an enlarged section taken on line 11—11 of Fig. 9;

Fig. 12 is an enlarged section taken on line 12—12 of Fig. 9;

Fig. 13 is a section illustrating the manner in which the tubular member shown in Fig. 9 may be immersed in a suitable compound to provide a coating thereon; and Fig. 14 illustrates how a coating may be sprayed on the tubular member shown in Fig. 9.

Figure 7:
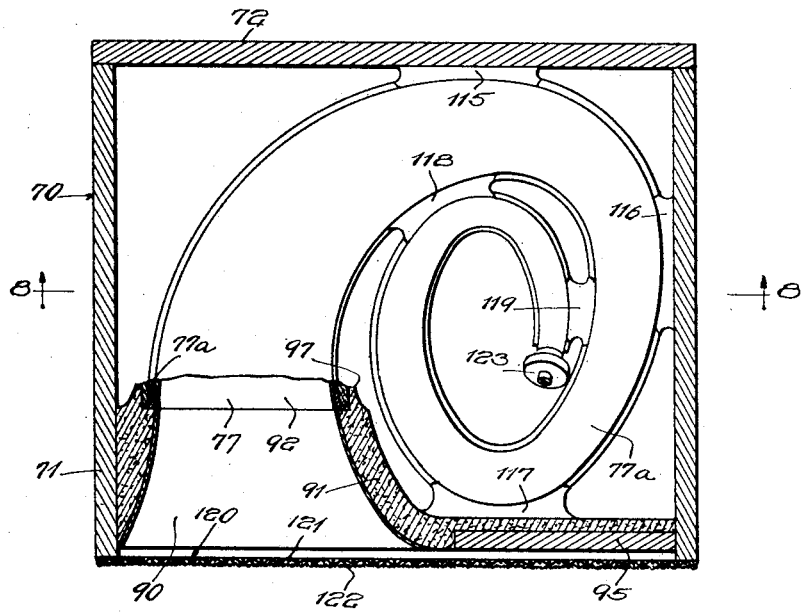
Fig. 7 is a plan section taken through an amplyfying horn which embodies another form of the invention.
Figure 8:
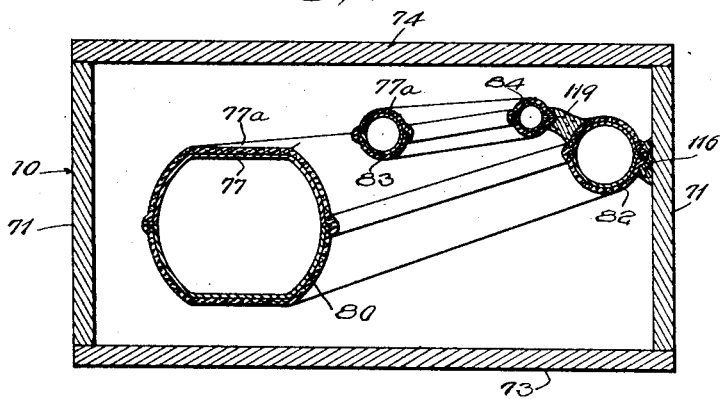
Fig. 8 is a section taken on line 8—8 of Fig. 7.

Referring for the present to Figs. 1 to 6, inclusive, wherein I have shown an amplifying horn embodying a preferred form of the invention, it will be noted that the improved horn comprises a housing which is designated generally by the reference character 20. However, in some instances, I may prefer to dispense with the housing 20, or equivalent structures, and therefore, it is to be understood that my invention is limited to the use of housings, or the equivalent, only to the extent indicated in the appended claims. In this instance, the housing 20 comprises a tubular shell or housing member 21 which is preferably somewhat rectangular in cross section and has its front end closed by a foraminous member 23, the foraminous member 23 preferably comprising a sheet or disk 24, of silk, velvet, or the equivalent, which is stretched taut over a screen 25, or the equivalent. The screen 25 is carried by an annular member 27 which is mounted upon the front end of the tubular housing member 21. The other end of the tubular housing member 21 is preferably closed by a cap member 28.

Disposed within the tubular housing member 21 and forming a partition extending transversely thereof is a plate 30 which is preferably formed from sheet metal and is preferably secured to the tubular housing member 21. Any suitable means may be provided for securing the plate 30 to the tubular housing member 21. In this instance, the plate 30 is provided with an annular flange 33 which is spot welded to the tubular member 21 as indicated at 34 in Fig. 2. As best shown in Fig. 2, the wall or plate 30 is preferably apertured as at 36 and 37, the aperture 36 being preferably formed by first slitting the plate 30 and then displacing the metal on one side of the slit to one side of the plate and displacing the metal on the other side of the slit to the other side of the plate. The aperture 36 thus formed is preferably substantially circular and is adapted to receive the larger end of a tapered tubular member 39. The tapered tubular member 39 has a tapered sound passage 40 therein.

The tubular member 39 is preferably formed from sheet metal in a manner best illustrated in Figs. 4, 5 and 6. As shown, the tubular member 39 is preferably fabricated from a plurality of pieces of sheet metal which are preferably substantially semi-circular in cross-section and are provided with outwardly extending flanges 43, the flanges 43 being preferably spot welded to each other. Of course, the pieces of sheet metal from which the tubular member 39 is formed may be stamped from any suitable material by any suitable means but I find it advantageous to use relatively thin sheet metal and to stamp this thin sheet metal into the correct shapes by employing relatively inexpensive dies cast from metals such as iron, zinc or the equivalent. Thus, I may construct a pattern of any desired shape from plaster or gelatine and then mold suitable dies therefrom. As shown, the tubular member 39 is preferably formed in sections, the larger end of each section being preferably disposed within the smaller end of the next larger section. The sections are preferably spot welded to each other as illustrated at 47 in Fig. 6.

In the embodiment of the invention shown in Figs. 1 to 6, inclusive, the smaller end of the tubular member 39 projects through the aperture 37 provided in the plate 30 and is preferably spot welded to an annular flange 48 struck up from the plate 30. The plate 30 cooperates with the foraminous member 23 to form a chamber in the front end of the tubular housing member 21, the construction being such that the discharge end of the sound passage 40 opens into this chamber. It will be noted that a reproducing unit 50 which communicates with the small end of the sound passage 40 is disposed within the chamber provided in the front end of the tubular housing member 21. This construction is advantageous in that the reproducing unit 50 is preferably constructed so that it can reproduce sounds in the chamber in which it is disposed and these sounds need not travel through the tubular member 39. With this construction, the higher tones tend to pass directly from the reproducing unit through the foraminous member 23 without first passing through the tubular member 39 as in tests with amplifying horns embodying the construction shown in my United States Letters Patent No. 1,650,307, it has been found that when the higher tones are being reproduced, relatively little volume is obtained by way of the sound passages, the major portion of the sound passing directly from the reproducing units through the foraminous members. However, when the lower tones are being reproduced, a large volume of sound issues from the sound passages. In amplifying horns embodying my present invention, the higher tones are not absorbed to such an extent by the smooth sheet metal walls of the sound passages but it is advantageous to position the reproducing units where the high tones may pass directly through the foraminous members without first passing through the sound passages.

As best shown in Figs. 2 and 3, the tubular member 39 formed from sheet metal is preferably provided with a coating 52 which is preferably applied directly to the outer surface of the tubuler member 39. In this instance, the coating 52 is formed from some substance, mixture or compound such as plaster of Paris or molding plaster. Such material does not vibrate readily and, therefore, prevents vibration of the sheet metal to which it is applied. It will be noted that the inner surface of the plate 30 and that the inner surface of the tubular housing member 21 are also coated as shown at 54 and 55 respectively, the coatings 54 and 55 being preferably formed integral with the coating 52 and being preferably of the same substance. Any suitable method may be employed to form the coatings 52, 54 and 55. In this embodiment of the invention, I preferably assemble the tubular member 39 and the plate 30 with the tubular housing member 21 and then rest the front end of the tubular housing member 21 upon any suitable support. I then pour the material from which the coatings 52, 54 and 55 are to be formed into the tubular housing member 21, enough of this material being employed to substantially fill the tubular housing member 21. Of course, it is understood that the coating material is preferably in a substantially liquid state and that after it has been introduced into the tubular housing member 21, it commences to set or harden. Instead of permitting the entire body of coating material to set or harden, I pour off the excess coating material after a layer thereof of sufficient thickness has set and adhered to the inner surface of the tubular housing member 21, the inner surface of the plate 30 and the exterior surface of the tubular member 39. After the excess material has been poured out of the tubular housing member 21, the remaining material is permitted to set or harden until it is no longer moist and then I preferably apply coatings 60, 61 and 62 over the coatings 52, 54 and 55, respectively. The coatings 60, 61 and 62 are preferably formed of some substance or material which is not as brittle as the substance or material from which the coatings 52, 54 and 55 are formed and do not tend to chip or crack, it being readily understood that if the coatings 52, 54 and 55 are formed from plaster of Paris or molding plaster or some equivalent material, these coatings will be relatively brittle and will tend to chip or crack. For the coatings 60, 61 and 62, various substances may be used such as for instance, compounds formed from heavy petroleum distillates, bituminous substances, coal tar distillates, vegetable resins and the like. However, I preferably form the coatings 60, 61 and 62 from a mixture of adhesive and some granular or fibrous substance such as sawdust, asbestos, whiting, or the equivalent. The adhesive may be some substance such as silcate of soda, shellac, tar, glue, asphalt, an adhesive cellulose derivative, or the equivalent. The coatings 60, 61 and 62 may be applied by using the method described above whereby the coatings 52, 54 and 55 are preferably applied, but generally the coatings 60, 61 and 62 can be sprayed over the coatings 52, 54 and 55 or applied with a brush, or the equivalent. The material from which the coatings 60, 61 and 62 are formed is preferably applied more or less in a liquid state and is then permitted to dry. In the embodiment of the invention shown in Figs. 1 to 6, inclusive, the coatings 60, 61 and 62 are illustrated as coatings formed from a mixture of an adhesive and a fibrous substance such as asbestos, finely divided wood, or the like. The coatings 60, 61 and 62 also prevent vibration of the tubular member 39 and, in some instances, I may apply these coatings directly to the exterior surface of the tubular member and to the interior surfaces of the tubular housing member and the plate without first applying the coatings 52, 54 and 55 thereto.

After the coatings 60, 61 and 62 have been applied to the coatings 52, 54 and 55, respectively, the reproducing unit 50 is secured in place to communicate with the small end of the sound passage 40, and the foraminous member 23 and the member 28 are secured to the tubular housing member 21. The amplifying horn shown in Figs. 1 to 6, inclusive, is particularly adapted to be used in connection with radio receiving apparatus and the reproducing unit 50 may be connected by electrical conductors 64 to such apparatus.

Referring now to Figs. 7 to 12, inclusive, wherein I have shown an amplifying horn which embodies another form of the invention, the reference character 70 designates a housing which may be constructed of any suitable material. Thus, it may comprise walls constructed of wood, or the equivalent, and in this instance, it is shown with side walls 71, a rear wall 72, a bottom wall 73 and a top wall 74. The walls 71, 72, 73 and 74 may be walls and partitions of a cabinet, or the like, which also contains radio receiving apparatus. If so desired, the housing 70 may be mounted as a unit in a suitable receptacle formed in a cabinet in which radio receiving apparatus is mounted.

Disposed within the housing 70 is a tubular member 77 which is preferably constructed in a manner similar to which the aforementioned tubular member 39 is constructed. Thus, it preferably comprises a plurality of sheets of metal which have been stamped to form a plurality of tapering sections 80, 81, 82, 83 and 84. The sections are preferably spot welded to each other as indicated at 85. Each section preferably comprises two pieces of sheet metal of substantially arcuate cross section (Fig. 10) and each piece of sheet metal is provided with outwardly extending flanges 86. The flanges 86 of the sheet metal pieces of each section are preferably spot welded to each other as indicated at 86a and in some instances, I prefer to stamp tongues 88 from the flanges to secure them to each other (see Figs. 10 and 11). Of course, the flanges may be secured to each other by the tongues 88 without spot welding if it is so desired. The tubular member 77 forms a tapered sound passage 92 and the larger end thereof preferably communicates with a flaring aperture 90 formed in a molded member 91 which is preferably formed from plaster of Paris, molding plaster, or the equivalent. The flaring aperture 90 forms a continuation of the sound passage 92. The molded member 91 may be formed in a suitable mold and then secured in place within the housing 70 but I preferably mold it directly in the housing, the molding being done by employing suitable mold members (not shown) which may be temporarily secured in the housing. In Fig. 7 I have shown a short partition 95 in the housing 70 which serves to reenforce the mold member 91, and at 97 I have shown an enlarged portion of the aperture 90, which enlarged portion is adapted to receive the large end of the tubular member 77. However, either before or after assembling the tubular member 77 with the molded member 91, I preferably coat its exterior surface with a mixture of adhesive and some granular or fibrous substance such as sawdust, asbestos, whiting or the like. The adhesive is preferably some substance such as silicate of soda, shellac, tar, glue, asphalt, an adhesive cellulose derivative, or the equivalent. In this instance, the coating comprises a mixture of an adhesive substance and a granular substance such as whiting and is identified by the reference character 77a. Various methods may be employed to coat the tubular member 77. Thus, in Fig. 13, I have illustrated a preferred method of coating the tubular member, which method comprises dipping the horn into a receptacle 100 which contains the coating material in a liquid or semi-liquid state. Of course, the ends of the tubular member 77 are first closed by means of plugs 101 and 102, or the equivalent, and the tubular member is either forced below the surface of the coating material or weights are placed therein so that it will sink below the surface thereof. The tubular member is permitted to remain in the coating material until a coating thereof adheres to the exterior surface of the tubular member. This layer is then permitted to harden and one or more additional layers are then preferably added thereto to make a coating of the desired thickness. However, in some instances, a single layer will be sufficient.

In Fig. 14, I have illustrated another method which may be practiced to coat the tubular member 77. Thus, the tubular member may be suspended by means of a string 110, or the equivalent, and the coating material may be sprayed from a nozzle 111, the material being sprayed thereon to form a coating of the desired thickness and being permitted to harden before the tubular member is assembled with the molded member 91.

In some embodiments of the invention, I may prefer to pour the coating material on the tubular member or to apply it thereto with a brush, or the equivalent.

The rear wall 72 and the top wall 74 may be secured in place after the molded member 91 has been formed in the housing and after the tubular member 77 has been brought into the position wherein it is shown in Fig. 7. Then plaster of Paris, molding plaster or some like substance is preferably introduced into the enlarged portion 97 of the aperture 90 and permitted to set so that it will rigidly secure the large end of the tubular member 77 to the molded member 91. Also, the tubular member may be secured to the rear wall 72, to one or more of the side walls 70 and to the molded member 91 by employing plaster of Paris, molding plaster, or the like. Thus, at 115, I have shown a quantity of material which secures the tubular member to the rear wall 72 and at 116 and 117 I have shown quantities of molding material which secure the tubular member 77 to one of the side walls 70 and to the molded member 91, respectively. I also show quantities of molding material at 118 and 119 which tie adjacent turns of the tubular member 77 to each other. It is, of course, understood that as much molding material as desired may be introduced into the housing member to prevent displacement of the tubular member relative to the housing and the molded member 91. But I preferably employ a minimum amount of molding material for this purpose so as to reduce the weight of the amplifying horn. Like the tubular member 39, the tubular member 77 is preferably convoluted so that the improved amplifying horn will be compact.

The front end of the housing member 70 is preferably closed by a foraminous member 120 which preferably comprises a screen 121 and a silk panel 122. Carried by the tubular member 77 and communicating with the smaller end of the sound passage 92 is a reproducing unit 123 which may be connected in the usual manner to a radio receiving set, or the equivalent.

The construction described above and illustrated in the drawings is particularly advantageous in that the amplifying horns embodying the invention weigh comparatively little and therefore, can be shipped and handled inexpensively. Although the walls of the tubular or horn members 39 and 77 are relatively thin, the coatings thereon serve to prevent vibration of the metallic portions of the horns so that sound issuing from the horns is not distorted by reason of such vibration.

As set forth above, the coatings 60, 61, 62 and 77a are preferably formed of a mixture of adhesive and a fibrous or granular substance, the adhesive being in liquid form when the mixture is being applied to the tubular members. After the mixture has been applied, the adhesive is permitted to harden. The adhesive employed does not have the characteristics of plaster of Paris or molding plaster as it does not chip or flake. I contemplate making these coatings of sufficient thickness to prevent vibration of the walls of the tubular members. In some instance, the coatings may be a little less than one sixteenth of an inch thick but in the preferred construction, they are more than one sixteenth of an inch thick. Thus, I contemplate constructing most of the horns in such manner that the coatings 60, 61, 62 and 77a will be one-eighth of an inch thick or more. It should be understood that these coatings do not resemble coats of paint as a coat of paint will not prevent vibration of the walls of the tubular member. In other words, a coat of paint is rarely one thirty-second of an inch thick and therefore, would not hold the sheet metal substantially rigid, it would not absorb the vibration of the sheet metal to any appreciable extent. The coatings 52, 54 and 55 are preferably one-sixteenth of an inch or more in thickness.

Having thus described my invention; it is obvious that various immaterial modifications may be made in the same without departing from the spirit of my invention; hence I do not wish to be understood as limit- ing myself to the exact form, construction, arrangement and combination of parts herein shown and described, or uses mentioned.

What I claim as new and desire to secure by Letters Patent is:

1. An amplifying horn comprising a tapered tubular member formed from sheet metal, and a sheet metal housing member surrounding said tubular member, and a coating on said tubular member and said housing member at least one-sixteenth of an inch thick for preventing vibration of the sheet metal.

2. An amplifying horn comprising a tubular member formed from sheet metal, a coating of moldable material on said tubular member to prevent vibration thereof, and a second coating of a different substance covering the first-mentioned coating to prevent cracking or flaking of the first-mentioned coating.

3. An amplifying horn comprising a tubular member formed from sheet metal, a sheet metal housing for said tubular member and a coating on the exterior surface of said tubular member and on the interior surface of said housing member for preventing vibration of the sheet metal, said coating comprising a mixture of an adhesive substance and a granular substance.

4. An amplifying horn comprising a tubular member formed from sheet metal, a sheet metal housing for said tubular member, and a coating on the exterior surface of said tubular member and on the housing member for preventing vibration of the sheet metal, said coating comprising a mixture of an adhesive substance and a fibrous substance.

5. An amplifying horn comprising a tapered tubular member, and a plurality of dissimilar coatings thereon to prevent vibration thereof.

6. An amplifying horn comprising a tapered tubular member formed of a plurality of tubular sections secured to each other, said tubular member being curved to provide a complete convolution thereof, and a plurality of coatings of dissimilar materials on said tubular member for preventing vibrations thereof.

7. An amplifying horn comprising a tapered tubular member, said tubular member comprising a plurality of sheet metal pieces substantially semi-circular in cross-section and secured to each other, and a plurality of coatings of dissimilar materials on said tubular member for preventing vibration thereof.

8. An amplifying horn comprising a housing member, and a tapered tubular member formed of sheet metal and coiled in said housing member, said tubular member having at least one complete convolution formed therein, and a coating on said housing member and said tubular member to prevent vibration thereof.

9. An amplifying horn comprising a tapered tubular member formed from sheet metal, a housing for said tubular member, and a coating of moldable material on said tubular member and said housing to prevent vibration thereof.

In testimony whereof, I have hereunto signed my name.

FRED W. TEMPLE.